United States Patent [19]

Karelitz

[11] 3,841,730

[45] Oct. 15, 1974

[54] IMAGE PRODUCING DEVICE

[76] Inventor: Judith Karelitz, 430 E. 86th St., New York, N.Y. 10028

[22] Filed: Dec. 18, 1972

[21] Appl. No.: 316,099

[52] U.S. Cl. ................................. 350/5, 240/1 EL
[51] Int. Cl. ........................................... G02b 27/08
[58] Field of Search .................... 350/4, 5; 240/1 LP

[56] References Cited
UNITED STATES PATENTS

| | | | |
|---|---|---|---|
| 1,835,876 | 12/1931 | Jenkins | 350/4 |
| 2,115,986 | 5/1938 | DaCosta | 350/5 X |
| 3,449,036 | 6/1969 | Jacobsen | 240/1 LP X |
| 3,748,013 | 7/1973 | Orans | 350/5 |

*Primary Examiner*—Richard A. Wintercorn
*Attorney, Agent, or Firm*—Hubbell, Cohen & Stiefel

[57] ABSTRACT

An amusement device for producing a variety of unusual changing images, comprising a central, internally transparent member having arcuate means for causing interior reflection extending substantially the entire length of the member. An object supporting member at one end of the central member may contain a multiplicity of small objects, which may be of birefringent material. The eyepiece, disposed at the other end of the chamber, may have a light polarizing viewing surface, and another light polarizing surface may be disposed at the end of the object supporting member remote from the viewing surface. Either or both of the eyepiece and object supporting member may be rotatable relative to the central chamber. The object supporting member may be replaced by a lens for viewing outside objects.

8 Claims, 8 Drawing Figures

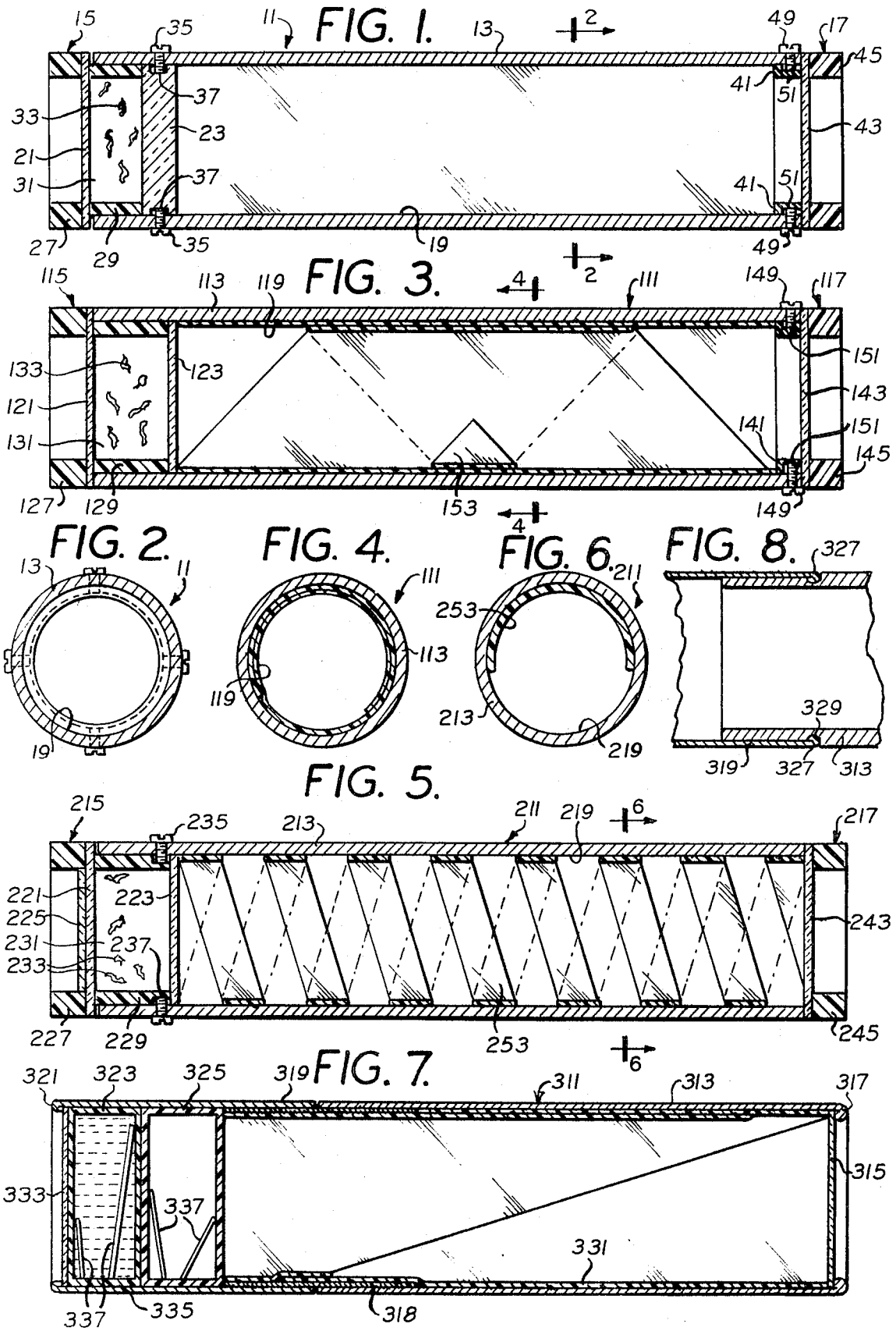

IMAGE PRODUCING DEVICE

BACKGROUND OF THE INVENTION

1. Field of the Invention

This invention relates to an amusement device in which a substantially infinite variety of changing images may be produced by projecting light through an opening therein.

2. Description of the Prior Art

Kaleidoscopes have internal, substantially planar, angularly related longitudinally extending reflective surfaces. They are all basically similar in that they have an eyepiece at one end of a hollow tube, longitudinally extending planar mirrors angularly disposed within the tube, and an object containing enclosure having a transparent wall facing the central chamber of the tube mounted at the other end of the tube. The objects are usually colorful, of a wide variety of shapes, and are usually transparent, although they are sometimes translucent and, less frequently, may be opaque. Generally, the outside end surface of the enclosure is translucent rather than transparent and the objects may be sufficiently illuminated by aiming the device at a source of light such as a lamp or a bright window. Many variations and refinements of this basic device have been developed, including the expedients of suspending the objects in a clear liquid medium and the provision of self-contained illumination sources. The devices described in U.S. Pat. No. 3,383,150, issued May 14, 1968, to E. A. Powers are typical.

SUMMARY OF THE INVENTION

My invention is an image-producing device comprising an elongate internally transparent member having arcuate means for causing interior reflection extending substantially the entire length thereof, light-transmitting objective means mounted at one end of the elongate member in light-transmitting communication with the interior reflecting means, and viewing means at the other end of the elongate member communicating with the reflecting means for viewing the objective means through the elongate member.

BRIEF DESCRIPTION OF THE DRAWINGS

FIG. 1 is a longitudinal sectional view of a device in accordance with the present invention;

FIG. 2 is a sectional view taken along lines 2—2 of FIG. 1;

FIG. 3 is a longitudinal sectional view of another device embodying my invention;

FIG. 4 is a sectional view taken along lines 4—4 of FIG. 3;

FIG. 5 is a longitudinal sectional view of yet another embodiment of my invention;

FIG. 6 is a sectional view taken along line 6—6 of FIG. 5.

FIG. 7 is a longitudinal sectional view of still another embodiment of my invention; and FIG. 8 is a fragmentary sectional view showing a variation of the device of FIG. 7.

DESCRIPTION OF THE PREFERRED EMBODIMENTS

As already indicated, the image producing device of the present invention broadly comprises an elongate central internally transparent member having arcuate means for causing interior reflection extending substantially the entire length thereof, an objective means such as an object supporting member or a lens mounted at one end of said elongate member, light transmitting means at said one end of said elongate member, and means at the other end of said elongate member for viewing said objective means through said elongate member. The arcuate reflective means, which may be varied in many ways as discussed in detail herein, produces novel and unusual optical effects including an image which has a spiral appearance. While any desired external shape can be selected for the elongate member, the shape of its internal surface must be arcuate and substantially non-planar. Generally, and as illustrated in the drawings, both the elongate member and the object supporting member will be hollow cylinders, although, as indicated, they may be of other shapes, so long as the inner surface of the elongate member is arcuate.

The casing of the device may be composed of any suitable opaque, translucent or transparent material, e.g., cardboard, metal, Plexiglas, glass, Lucite, and the like. Any suitable means for achieving the reflective inner surface can be employed, such as polishing, coating, or lining the surface with a sheet of reflective material. While the elongate member is usually hollow, it may be a solid of suitable transparent material, such as a column of Plexiglas. In another embodiment, the hollow central member may be filled with a liquid such as water or mineral oil.

Thus, as employed herein, the term "arcuate inner reflective surface" includes any arcuate surface which causes light to be reflected back within the central elongate member either by the use of a polished or coated surface or in reliance on total internal reflection.

Moreover, as used herein, the term "interior reflection" means any reflection of light which takes place within a device, particularly within the central elongate chamber of my device; and the term "internally transparent" refers to the capacity to transmit light through a member, and includes hollow articles whether or not their walls are transparent, which devices may be filled with transparent material such as air, water, or oil, as well as solid articles of transparent material such as solid columns of Plexiglas and the like.

In one preferred embodiment, either or both of the viewing means and the object supporting member are rotatable relative to a central, elongate hollow member.

In a particularly preferred embodiment, the object supporting member contains small pieces of birefringent material, such as cellophane, and these objects are sandwiched between first and second light polarizing sheets which are rotatable relative to each other. As is known, the "sandwich" of birefringent material between two sheets of polarizing material thus formed produces interesting color effects. Rotating one of the light polarizing means relative to the other causes the color of the light transmitted through the birefringent material to change.

These and other embodiments of the invention will be better understood from the detailed description which follows, as illustrated by the accompanying drawings.

Referring particularly to the drawings, a device 11 embodying the present invention is illustrated in FIGS.

1 and 2. This device comprises a hollow cylinder 13 having rotatably mounted at one end thereof a cylindrical object supporting member or container 15, while viewing means 17, an eyepiece, is rotatably mounted at the other end of the cylinder 13.

Cylinder 13 can be fabricated of any suitable material, which material may be opaque, translucent or fully transparent, as desired. For example, cardboard, metal or rigid plastic such as Plexiglas may be employed. Preferably, the exterior of the cylinder is opaque. As illustrated, cylinder 13 is Plexiglas having an opaque outer surface and a highly reflective inner surface, the inner surface 19 of cylinder 13 forming one continuous, smooth reflective surface. Alternatively, and as will be apparent from the description of other embodiments, this reflective surface can be achieved by lining surface 19 with a film of highly reflective material.

Object supporting member 15 is cylindrical in shape, and comprises an outer disc 21 and an inner disc 23 mounted at opposite ends of a cylindrical wall 29 by any suitable means, such as an adhesive. As illustrated, the outer diameter of wall 29, as well as the diameter of disc 23, is slightly smaller than the inner diameter of cylinder 13, and a portion of cylinder 13 overlies wall 29. The diameter of disc 21 is approximately equal to the outer diameter of cylinder 13. Discs 21 and 23 define therebetween an object compartment 31 wherein are disposed a plurality of objects 33, at least a portion of which are preferably birefringent. Member 15 is rotatably mounted on cylinder 13 by means of one or more screws (or pins) 35 which extend radially through the portion of cylinder 13 which overlies wall 29 and partially into an external, circumferential groove 37 in disc 23. Naturally, groove 37 could be otherwise located, for example, in wall 29, if desired, and screws 35 would be located accordingly to be in register therewith. A clear, cylindrical rim 27, of substantially the same outer diameter as that of cylinder 13, is mounted on the outside of disc 21 by any suitable means such as glueing, etc. Rim 27 serves both to protect disc 21 and to afford convenient means for rotating member 15. If desired, a clear protective sheet (not shown) may be fixed to the outer end of rim 27 to provide additional protection for disc 21. Wall 29 may be opaque, transparent or translucent, as desired. Preferably, but not necessarily, the inner surface of wall 29 is reflective so as to enhance the illumination of objects 33.

Disc 21 may be composed of any suitable translucent or transparent material, although in the embodiment of FIGS. 1 and 2 it is composed of a translucent sheet of light-polarizing material. Disc 23 is preferably transparent, although sometimes it may be only translucent. In the illustrated embodiment, it is composed of a sheet of clear plastic.

Preferably, as indicated, objects 33 are pieces of birefringent material, such as cellophane or mica. However, any transparent, translucent or opaque material may be employed, although generally not all of the objects will be opaque. In one preferred embodiment, compartment 31 is filled with a clear liquid such as mineral oil. In a variation of the latter embodiment (not illustrated), the liquid and birefringent material may be contained in a vinyl pouch of any desired shape disposed within compartment 31.

Viewing means 17, as illustrated, is a typical cylindrical eyepiece comprising a cylindrical wall 41 and a disc 43 fixed to the outer end of wall 41. The outer diameter of wall 41 is slightly smaller than the inner diameter of cylinder 13; and, as shown, a portion of cylinder 13 overlies wall 41. The diameter of disc 43 is approximately equal to the outer diameter of cylinder 13. A cylindrical rim 45, which has substantially the same outer diameter as cylinder 13 (and may, indeed, be identical to rim 27 of member 15), is mounted on the outer end of disc 43 by any suitable means, such as cementing. Rim 45 serves the same function for eyepiece 17 as does rim 27 for object-supporting member 15.

Disc 43 is transparent and preferable comprises light-polarizing material. If desired, a clear sheet of protective material (not shown) may be mounted to the extreme outer end of rim 45 in any suitable manner as discussed in connection with the outer end of rim 27.

As was true for object container 15, eyepiece 17 is rotatably mounted on cylinder 13 as by one or more screws or pins 49 extending radially through cylinder 13 and partially into an outer circumferential groove 51 in wall 41.

In operation, device 11 is aimed at a source of light (not shown). If desired a light source (not shown) may be mounted on or associated with the device to provide a self-contained light source, which, in use, would be located externally of disc 21. Light from the light source passes through polarizing disc 21, birefringent objects 33 and clear disc 23. The light is then subjected to reflection off arcuate reflective inner surface 19 and then passes through polarizing disc 43, whereupon it is viewed.

By rotating either container 15 or eyepiece 17, the polarity of the light entering compartment 31 or that of the light leaving eyepiece 17 is changed, thereby, in either event, changing the color effects produced by the sandwich of polarizing discs 21, 43 and birefringent objects 33.

Moreover, rotating compartment 15 will cause movement of objects 33 in compartment 31, thereby changing the pattern or array of the objects. Naturally, if the objects 33 are suspended in a liquid (such as mineral oil), their movement is much more gradual and therefore longer lasting than would be the case if compartment 31 contained air instead of oil, thereby causing a pleasing, continual slow change of image.

As will be appreciated, if only container 15 is rotated while holding eyepiece 17 and cylinder 13 stationary, not only will the pattern of objects in compartment 31 be changed, but the color of the light will be changed as well, inasmuch as there will be relative movement between polarizing discs 21 and 43. Change in color without change in the pattern of objects can be achieved by rotating eyepiece 17 while holding container 15 stationary. Change in the pattern of objects without effecting any substantial color change will be achieved by rotating container 15 and eyepiece 17 in the same direction at the same rate, this latter feat being most readily accomplished by fixing both container 15 and eyepiece 17 to cylinder 13 and rotating cylinder 13.

An alternative embodiment of my invention, viewing device 111, is illustrated in FIGS. 3 and 4. This device comprises a hollow cylinder 113 of opaque material, having a cylindrical object container 115 fixedly mounted at one end thereof and an eyepiece 117 rotatably mounted at the other end thereof.

The inner surface 119 of cylinder 113 is made reflective by covering it with a sheet 153 of highly reflective material, such as a clear or a metallized polyacetate, Mylar or another polyester or polarized film. As shown, sheet 153 is spirally wound on the interior wall of cylinder 113. As shown, adjacent convolutions of sheet 153 overlap at least a portion of the previous turn and are in turn telescoped within the next successive turn. This is a particularly simple and effective means for providing the reflective inner surface in that it can be achieved by wrapping a sheet of reflective material which is somewhat shorter than the cylinder around a core, laterally separating the ends of the wrapped sheet to a length slightly in excess of that of the cylinder, cutting off the ends of the wrapped sheet to achieve substantially the same length as that of the cylinder, and inserting the sheet within the cylinder. The sheet will thus form a self-supporting reflective lining which will be biased against the inner wall of the cylinder.

Object container 115 is cylindrical in shape, and substantially identical to container 15 of device 11 except for the means whereby it is mounted onto the central cylinder. Thus, it comprises an outer disc 121 and an inner disc 123 mounted at the outer and inner ends, respectively, of a cylindrical wall 129. The general relationship between wall 129 and cylinder 113 is the same as in device 11 of FIGS. 1 and 2, with cylinder 113 overlying wall 129, (although the arrangement could, of course, be reversed by reversing the dimensions, if desired); and, similarly thereto, discs 121 and 123 define therebetween an object compartment 131 wherein are disposed a plurality of objects 133. However, container 115 is fixedly mounted to cylinder 113 as by cementing. Naturally, other suitable means could be employed, such as complementary threads on adjacent surfaces of the overlapping portions of wall 129 and cylinder 113, press fitting, or other alternative means of securement.

As in device 11, a cylindrical rim 127 is mounted on the outside of disc 121, and disc 121 is preferably composed of a translucent polarizing sheet of glass or plastic. Disc 23 is preferably composed of a sheet of clear plastic. Objects 133 are preferably of birefringent material, such as cellophane. Compartment 131 may be filled with any fluid, for example, air or a clear liquid such as mineral oil.

Eyepiece 117, as illustrated, is preferably identical to eyepiece 17 of device 11, and comprises a cylindrical wall 141, a transparent disc 143 of polarizing material mounted on the outer end of wall 141 and a cylindrical rim 145 mounted on the outer end of disc 143. Eyepiece 117 is rotatably mounted on cylinder 113 in the same manner as eyepiece 17 is mounted on cylinder 13 of device 11, one or more pins or screws 149 extending radially through cylinder 113 into an outer circumferential groove 151 in wall 141.

The operation of device 111 is very similar to that of device 11. Substantially the only difference is that only eyepiece 117 is rotatable relative to cylinder 113, so that the entire cylinder 113 must be rotated in order to rotate container 115 and thereby change the pattern of objects therein. Of course, as will be understood, rotating only eyepiece 117 is sufficient to change the color effects produced by the sandwich of polarizing discs 121, 143 and birefringent objects 133.

Yet another device embodying the present invention, device 211, is illustrated in FIGS. 5 and 6. This device is similar in construction to those previously described and comprises a hollow cylinder 213 having rotatably mounted at one end thereof a cylindrical object container 215, while an eyepiece 217 is fixedly mounted at the other end of cylinder 213.

Cylinder 213 is preferably transparent. The inner surface 219 of cylinder 213 has a highly reflective film 253, such as of metallized Mylar or polyacetate, helically wound thereon. However, in contradistinction to device 111, adjacent convolutions of film 253 are spaced apart from each other.

Container 215 is similar in construction to container 15 of device 11 of FIGS. 1 and 2. Thus, it is cylindrical in shape, and comprises an outer disc 221 and an inner disc 223 mounted at opposite ends of a transparent cylindrical wall 229. Discs 221 and 223 define therebetween an object compartment 231. As in the previously described embodiments, the diameter of disc 223 is substantially identical to the outer diameter of wall 229, both being slightly smaller than the inner diameter of cylinder 213, while the diameter of disc 221 is substantially the same as the outer diameter of cylinder 213; and a clear, cylindrical rim 227 is mounted on the outside of disc 221. However, in device 211, both of discs 221 and 223 are clear plastic or glass, and a separate disc 225 of translucent or transparent polarizing material is press fit or otherwise secured inside rim 227. As previously indicated, cylinder 213, or at least the portion thereof which overlies wall 229 of container 215, is transparent.

As illustrated, compartment 231 contains birefringent objects 233 and is filled with a liquid having a refractive index approximating that of the birefringent objects therewithin, making the objects substantially invisible when viewed through the transparent walls 229 rather than through polarizing means. As illustrated, container 215 is rotatably mounted on cylinder 213 in a manner similar to that in which container 15 is mounted to cylinder 13 of device 11, with pins or screws 235 extending radially through cylinder 213 into an external, circumferential groove 237 in wall 229.

Eyepiece 217 is fixed to cylinder 213, and comprises a transparent disc 243 of polarizing material mounted on the outer end of cylinder 213 and a cylindrical rim 245 mounted on the outer end of disc 243. The mounting of disc 243 and rim 245 of eyepiece 217 may be accomplished by any suitable means such as cementing.

The operation of device 211 is substantially identical to that of the previously described devices, exept that, since eyepiece 217 is not rotatable relative to cylinder 213, relative rotation between container 215 and cylinder 213 must be effected in order to produce the changed effects of color and pattern discussed herein. In addition, since, as illustrated, compartment 231 of container 215 is filled with a liquid of approximately the same refractive index as the objects of birefringent material therewithin, whereby the objects are practically invisible when viewed in ordinary light, the same color and other visual effects as previously described, such as those due to the polarization of light through discs 221 and 243, are all the more startling.

It will be appreciated that by using a helical reflective covering 253 with spaced apart adjacent convolutions a special optical effect is achieved.

A particularly simple, inexpensive embodiment of my invention is shown in FIG. 7 which illustrates a device 311 comprising a paper tube 313 having a polarizing disc 315 secured at one end thereof by a ridge 317 formed by crimping the end of tube 313. An inner reflective surface is provided in tube 313 by a sheet of rolled-up reflective film 331. As is apparent, this arrangement provides an equivalent to cylinder 213 of device 211 with eyepiece 217 fixed thereto.

Another paper tube 319, which may be cut from the same paper tubing as is tube 313, is likewise crimped at one end thereof as shown at 321 and contains one or more object containers 323, 325. As shown in FIG. 7, yet another section of paper tubing 318, having an outer diameter substantially identical with the inner diameter of tube 313, is mounted at the end of tube 313 remote from crimped end 317 by any suitable means such as glueing. A portion of tube 318 extends beyond the end of tube 313 so that tube 319 may be rotatable mounted thereon. Moreover, compartments 323 and 325 each have an outer diameter sufficiently small that they can fit within tube 319, but larger than the inner diameter of tube 318 and therefore will not fit within tube 318. As shown, the inner surface of tube 318 is also reflective, the sheet of reflective film 331 extending thereover.

In a modification of this device illustrated in FIG. 8, tube 319 may be more securely, yet rotatably, mounted on tube 313, as by means of a ridge 327, which may be provided at the end of tube 319 by crimping, and a complementary circumferential groove 329 in the overlying portion of tube 313.

Referring again to FIG. 7, a clear polarizing disc 333 is retained at the end of tube 319 remote from tube 313 by crimped end 321. While one, three, or any desired number of object compartments may be employed, as already indicated, in the illustration of FIG. 7 there are two such compartments, provided by containers 323, 325, both being cylinders of a clear, rigid plastic such as Plexiglas. The cylindrical wall of container 323 may be lined with an opaque, highly reflective material, such as aluminum foil 335, and the container may be filled with a clear liquid as well as with objects of birefringent material 337. Container 325, on the other hand, may have no reflective coating and contains only air and other objects 337 of birefringent material.

As will be apparent, the operation of device 311 is identical to that of the previously described devices, there being provision for rotation at the joint between tubular elements 313 and 319. It will be observed that with the particular construction of device 311, with one liquid filled object container 323 and one air filled object container 325, rotation of tube 319 will result in rapid movement of objects 337 through the air in compartment 325 and relatively slow movement of objects 337 through the liquid in compartment 323, thus causing simultaneous rapid and slow changes in the pattern of objects 337. The color effects of the "sandwich" of polarizing discs 315, 333 and birefringent objects 337 are controlled in the manner explained in the description of the embodiments of FIGS. 1-6.

As will be apparent to those skilled in this art, many additional variations may be made without departing from the spirit and scope of the invention. For example, as indicated previously, container 15 can be replaced by a lens for viewing external objects, with the same unusual spiral visual effects caused by the arcuate interior reflection. In addition, the fluids which may optionally be present in one or more of the central cylinder and the object container compartments may be colored, and there may be different colors and viscosities of fluids in each of these compartments.

Moreover, the same basic color effect of the light polarizers and the birefringent material can be achieved by making discs such as discs 21 and 23 both of polarizing material (these discs not being rotatable relative to each other). Of course, in this case most of the additional color changing effect which can be achieved by relative rotation of the two polarizing discs will be lost.

Having thus described my invention, what I desire to secure by Letters Patent and hereby claim is:

1. An image producing device comprising an elongate hollow member having arcuate internal means for causing interior reflection extending substantially the entire length thereof, light transmitting objective means at one end of said elongate member in light transmitting communication with said interior reflecting means, and viewing means at the other end of said elongate member communicating with said reflecting means, said reflecting means comprising substantially the entire inner surface of said elongate hollow member and being formed of a spirally wound reflective sheet comprising a plurality of turns of said sheet, with each successive turn overlapping at least a portion of the previous turn and being telescoped within the next successive turn.

2. An image producing device comprising an elongate hollow member having arcuate internal means for causing interior reflection extending substantially the entire length thereof, light transmitting objective means at one end of said elongate member in light transmitting communication with said interior reflecting means, and viewing means at the other end of said elongate member communicating with said reflecting means, said interior reflecting means comprising a helically wound reflective sheet, the adjacent convolutions of which are in spaced apart relationship.

3. An image producing device comprising an elongate hollow member having arcuate internal means for causing interior reflection extending substantially the entire length thereof, light transmitting objective means at one end of said elongate member in light transmitting communication with said interior reflecting means, and viewing means at the other end of said elongate member communicating with said reflecting means, said objective means comprising an object supporting member and a plurality of objects of varying size, shape or color within said object supporting member.

4. The device of claim 3, wherein at least a portion of said objects are comprised of birefringent material, and said object supporting member includes a translucent sheet of light polarizing material, said viewing means comprises a transparent sheet of light polarizing material, and said birefringent material is between said polarizing sheets.

5. The device of claim 3, wherein said object supporting member is filled with a clear liquid medium.

6. The device of claim 3, further comprising means for permitting the rotation of said object supporting member relative to said viewing means.

7. The device of claim 4, further comprising means for permitting the rotation of said viewing means relative to said elongate member.

8. The device of claim 7, further comprising means for permitting the rotation of said object supporting member relative to said elongate member.

* * * * *